United States Patent
Yamaguchi et al.

(10) Patent No.: US 7,629,435 B2
(45) Date of Patent: Dec. 8, 2009

(54) METHOD FOR PRODUCING MASTICATED RUBBER

(75) Inventors: Tomoo Yamaguchi, Ibaraki (JP);
Mitsuhiko Tsuji, Ibaraki (JP);
Yasunobu Ina, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 739 days.

(21) Appl. No.: 10/998,621

(22) Filed: Nov. 30, 2004

(65) Prior Publication Data

US 2005/0119452 A1    Jun. 2, 2005

(30) Foreign Application Priority Data

Dec. 1, 2003    (JP)    ............................. 2003-401328

(51) Int. Cl.
*C08F 6/00* (2006.01)
*C08J 3/00* (2006.01)

(52) U.S. Cl. ............ 528/480; 264/211.21; 264/211.23; 366/81; 366/85; 366/89; 422/129; 425/113; 425/114; 425/204; 425/207; 425/208; 425/209; 525/191; 525/197

(58) Field of Classification Search ............ 264/211.21, 264/211.23; 525/191, 197; 528/480; 366/81, 366/85, 89; 422/129; 425/113, 114, 204, 425/207, 208, 209
See application file for complete search history.

(56) References Cited

U.S. PATENT DOCUMENTS

| 3,248,469 | A | | 4/1966 | Kosinsky et al. |
| 4,897,236 | A | * | 1/1990 | Rabiger et al. ......... 264/211.23 |
| 5,191,005 | A | * | 3/1993 | Murata et al. ............... 524/269 |
| 5,644,007 | A | * | 7/1997 | Davidson et al. .............. 526/64 |
| 5,679,759 | A | * | 10/1997 | Wittmann et al. ........... 528/196 |
| 5,914,157 | A | | 6/1999 | Munson et al. |
| 5,947,593 | A | * | 9/1999 | Inoue et al. .................... 366/85 |
| 6,419,729 | B1 | * | 7/2002 | Duffy et al. .................... 96/17 |
| 6,455,526 | B1 | * | 9/2002 | Kohn et al. ................. 514/248 |
| 2002/0093118 | A1 | * | 7/2002 | Inoue et al. ............ 264/211.23 |

FOREIGN PATENT DOCUMENTS

| DE | 42 06 718 C1 | 7/1993 |
| DE | 44 33 273 A1 | 3/1996 |
| DE | 101 40 215 A1 | 2/2003 |
| EP | 0 035 677 A1 | 9/1981 |
| EP | 0 111 391 A2 | 6/1984 |
| EP | 0 180 444 A2 | 5/1986 |
| JP | 62-44409 A | 2/1987 |
| JP | 10-101736 A | 4/1998 |
| JP | 10-102023 A | 4/1998 |
| JP | 2001-55548 A | 2/2001 |
| JP | 2001-200099 A | 7/2001 |
| WO | WO 97/36956 A1 | 10/1997 |

OTHER PUBLICATIONS

Japanese Office Action dated Dec. 19, 2007.
European Search Report dated May 30, 2005.

* cited by examiner

*Primary Examiner*—Terressa M Boykin
(74) *Attorney, Agent, or Firm*—Sughrue Mion, PLLC

(57) ABSTRACT

A method for producing a masticated rubber, which comprises the steps of masticating rubber at a shear rate of from 500 to 4,500 (l/s); and obtaining masticated rubber having a weight-average molecular weight of from 100,000 to 1,300,000.

3 Claims, No Drawings

METHOD FOR PRODUCING MASTICATED RUBBER

FIELD OF THE INVENTION

The present invention relates to a method for producing masticated rubber having a given molecular weight.

BACKGROUND ART

Natural rubber in an unmasticated state, ordinarily having a weight-average molecular weight of approximately 2,000,000, is extremely hard and, accordingly, it can neither be kneaded nor dissolved. In order to allow the natural rubber to be kneaded, it is necessary to decrease the weight-average molecular weight thereof to the range of approximately from 800000 to 1300000 by, even though slightly, applying shearing. Further, when the natural rubber is used after being dissolved in an organic solvent, since it is not dissolved in the organic solvent unless the weight-average molecular weight thereof is decreased to be 800000 or less, it is necessary to decrease the molecular weight thereof by masticating it to such an extent as it can be dissolved.

Further, synthetic rubber has a weight-average molecular weight of approximately from 300,000 to 1,000,000, which is lower than that of the natural rubber. Although low molecular weight rubber having a weight-average molecular weight of approximately from 10,000 to 50,000 is available in the market in the synthetic rubber, intermediate molecular weight rubber having a weight-average molecular weight of approximately from 100,000 to 200,000 is not available in the market. Therefore, it is sometimes required to decrease the molecular weight as the synthetic rubber having such high molecular weight as described above to the intermediate molecular weight.

As for methods for masticating rubber, there is a physical method in which mastication is performed such that the molecule cleavage is physically caused in the rubber by applying shear by means of a batch-type kneader such as a mixing roll, a Banbury mixer or a pressure kneader. Ordinarily, this physical method is in many cases performed by adding a mastication accelerator. Further, besides such physical method as described above, there is a chemical method in which a peptizing agent is added to a solvent to generate a radical which, then, chemically causes the molecule cleavage.

When the physical method is performed without using the mastication accelerator, it takes time and, particularly, when it is intended that the weight-average molecular weight is decreased down to 400,000 or less, it takes a large amount of time. This is because, when it is intended that the weight-average molecular weight is decreased down to 400,000 or less by the physical method, a viscosity is unduly decreased and, accordingly, it becomes hard to apply the shear. On this occasion, when the mastication is performed without using the mastication accelerator, it takes a still longer time.

In the chemical method, the molecular weight is controlled to a desired value by adjusting an amount of molecule cleavage by means of an amount of the peptizing agent to be added (Patent Documents 1 to 3). Specifically, the rubber is loaded in a dissolving kettle containing an organic solvent or the like and, then, added with the peptizing agent to cause a molecule cleavage while stirring and, as the molecular weight is decreased, the rubber comes to be dissolved in the organic solvent and, then, various types of compounding materials are mixed to the rubber in such a manner as they are dissolved in the resultant solution, to thereby obtain a dissolved article. Thereafter, this dissolved article is formed in a sheet shape by using a casting technique or the like and, then, put in a drying oven, to thereby remove the organic solvent therefrom.

However, this method requires a large amount of energy and, also, an expensive system for recovering an evaporated organic solvent.

[Patent Document 1]
  JP-A No. 10-101736;

[Patent Document 2]
  JP-A No. 10-102023

[Patent Document 3]
  JP-A No. 2001-55548

SUMMARY OF THE INVENTION

As has been described above, since a chemical method uses an organic solvent which causes an environmental pollution, a process and energy for removing the organic solvent are necessary. On such point as described above, a physical method which does not use the organic solvent is desirable. However, it is hard to efficiently obtain masticated rubber having a given molecular weight in a short period of time by the physical method and, particularly, it has been difficult to efficiently obtain the masticated rubber having an intermediate weight-average molecular weight of 400,000 or less.

Under these circumstances, an object of the present invention is to provide a method for efficiently obtaining masticated rubber having a given molecular weight in a short period of time by the physical method.

As for kneaders for masticating rubber, a batch-type, kneader such as a mixing roll, a Banbury mixer or a pressure kneader have mainly been used. These kneaders are of a type in which kneading blades rotate in counter directions from each other to draw a material into the middle of these blades and, as described above, require a large amount of time in mastication and, accordingly, have hardly obtained the masticated rubber having a given molecular weight in a short period of time in an efficient manner.

On the other hand, as for continuous kneaders, there is a co-rotating twin screw extruder which is of a type in which kneading blades rotate in a same direction with each other to draw the material in a direction of a wall and is a mainstream one in twin screw extruder. However, when rubber is applied to such kneader, the rubber sometimes is not sufficiently drawn to a surface of the wall, to thereby cause a trouble. This is because the rubber is elastic and bounced back at an inlet of a feed screw.

Recently, a counter-rotating twin screw extruder has been developed as a new type of the kneader. This type of kneader, which is different from the co-rotating twin screw extruder, is of a type in which the material is drawn by 2 feed screws to the middle of the screws and, when the rubber is applied to this machine, the rubber is not bounced back even though it is elastic contrary to the above case, to thereby cause no trouble.

The present inventors have focused attention on this counter-rotating twin screw extruder and repeated a wide range of studies on masticating the rubber by using this kneader in practice and, as a result, found that, when the mastication is performed in a state of being applied with a high shear rate by allowing a tip clearance (gap between a screw and a wall surface) of the twin screw kneader to be as small as possible and a number of rotations of the screw to be large, molecule cleavage of the rubber tends to occur and, accordingly, the mastication can efficiently be performed in a short period of time and, further, the molecular weight of the rubber can arbitrarily be controlled in accordance with the shear rate, to thereby accomplish the prevent invention.

That is, the present invention has the following constitution.

(1) A method for producing a masticated rubber, which comprises the steps of:

masticating rubber at a shear rate of from 500 to 4,500 (l/s); and obtaining masticated rubber having a weight-average molecular weight of from 100,000 to 1,300,000.

(2) The method according to the above (1), wherein mastication is performed by using a counter-rotating twin screw extruder at a shear rate of from 500 to 4,500 (l/s).

(3) The method according to the above (2), wherein the shear rate is from 1,000 to 4,000 (l/s).

(4) The method according to the above (1), wherein the rubber is a member selected from the group consisting of natural rubber, polyisobutylene rubber and butyl rubber.

As has been described above, according to the present invention, mastication can effectively be performed in a short period of time and a molecular weight can arbitrarily be controlled by masticating rubber after loading it into an extruder having a high shear rate.

Further, according to the present invention, even an article having an intermediate molecular weight which has consumed a large amount of time to be produced by a conventional batch-type kneader can be produced in a short period of time. Still further, since it is not necessary to use an organic solvent or the like, a heat-drying process or the like is not necessary, to thereby contribute to saving energy and be desirable from a global environment.

DETAILED DESCRIPTION OF THE INVENTION

The invention will be described below in detail.

An apparatus to be used for performing mastication according to the present invention is not limited to specific types so long as it is designed such that a shear rate is set to be from 500 to 4,500 (l/s) and preferably from 1,000 to 4,000 (l/s). However, from the reason as has previously been described, it is desirable to use a counter-rotating twin screw extruder.

The shear rate can be determined by the following expression (1):

$$\text{shear rate (l/s)} = (A \times B)/C \qquad (1)$$

wherein A represents a circumferential length of a screw (diameter of screw $\times \pi$);

B represents the number of rotations of the screw; and

C represents a tip clearance.

On this occasion, as the tip clearance becomes smaller and the circumferential length of the screw and the number of rotations of the screw become larger, the shear rate can be designed to be higher. Since the diameter of the screw or the tip clearance depends on the apparatus, the shear rate can be designed to be high by setting the number of rotations of the screw to be large at the time of operation of the apparatus and, by such designing, mastication can efficiently be performed in a short period of-time and, also, the molecular weight of the rubber can arbitrarily be controlled in accordance with the number of rotations of the screw.

In the counter-rotating twin screw extruder, ordinarily the diameter of the screw is set in the range of from 30 to 100 mm and the tip clearance is set in the range of from 0.5 to 2 mm and, therefore, by taking these values into consideration, the number of rotations of the screw is appropriately set and, then, the shear rate may be designed such that it is in the range of from 500 to 4,500 (l/s).

On this occasion, when the shear rate becomes 500 (l/s), it is difficult to efficiently perform the mastication in a short period of time, whereas, when it becomes over 4,500 (l/s), the number of rotations of the screw becomes unduly large, to thereby be liable to cause a problem in the operation of the apparatus.

According to the present invention, as for rubber to be masticated at the aforementioned shear rate, natural rubber having a weight-average molecular weight of approximately 2,000,000 is ordinarily used. As for types and classes of the natural rubber, any one of standard rubber such as SMR (produce of Malasia) and STR (produce of Thailand) and SVR (produce of Vietnam), ribbed smoked sheet (RSS) and crepe rubber is permissible. Besides these natural rubber, synthetic rubber such as polyisobutylene and butyl rubber may be used.

According to the present invention, by masticating the rubber at the shear rate in the above-specified range, masticated rubber having a weight-average molecular weight of from 100,000 to 1,300,000 can be prepared in accordance with the shear rate. The thus-prepared masticated rubber can be used not only as ordinary rubber for being kneaded or being dissolved but also as a rubber component having various types of functions such as a tackiness function.

Although the natural rubber having a weight-average molecular weigh of over 400,000 is, in many occasions, compounded as a major component for being kneaded or dissolved, since the natural rubber having an intermediate molecular weight in which a weight-average molecular weigh is from 100,000 to 400,000 has tackiness specific to the natural rubber, it can be compounded as an auxiliary component and exert a function as a tackifier.

By masticating the synthetic rubber having a weight-average molecular weight of from approximately 300,000 to approximately 1,000,000 to generate that having an intermediate molecular weight of from approximately 100,000 to approximately 200,000, a function specific to the synthetic rubber in accordance with such molecular weight as described above can be exerted.

When the natural rubber is utilized in these various applications, since a rubber material after being masticated does not contain an organic solvent which will cause an environmental pollution, it is not necessary to provide a heat-drying process by a drying furnace and, therefore, the natural rubber is friendly to the global environment and can contribute to saving energy to a great extent.

EXAMPLES

Next, the present invention is described in more specifically by describing Examples 1 to 4 as embodiments of the present invention in comparison with Comparative Examples 1 to 8. However, the present invention is not limited to these embodiments.

In the following descriptions, a weight-average molecular weight of masticated natural rubber is first measured by a gel-permeation chromatography (GPC) and, then, determined in terms of polystyrene. On this occasion, a tetrahydrofuran (THF) solution of 1 g of a sample in a liter of THF was prepared and, then, left to stand overnight and, thereafter, filtered by using a membrane filter of 0.45 μm, to there by obtain a filtrate which is, then, used as a measuring sample.

An apparatus and conditions of GPC are as follows:

Apparatus: HCL-8120GPC (trade name: available from Tosoh Corporation);

| Conditions: | |
|---|---|
| Column: | TSK gel GMH-H(S) x 2 (two columns in series; size: 8 mm x 300 mm); |
| Eluant: | THF; |
| Flow rate: | 0.5 ml/min.; |
| Detector: | RI; |
| Column temperature: | 40° C.; |
| Injection rate: | 100 μl; and |
| Molecular weight: | in terms of polystyrene. |

Example 1

Standard natural rubber SVR (weight-average molecular weight: 2,000,000) was loaded in a counter-rotating twin screw extruder HTM 50 (trade name; available from Century One Engineering) (screw diameter: 50 mm, tip clearance: 0.5 mm) at a loading rate of 20 kg/hour and, then, masticated while the number of rotations of the screw was set to be 100 rpm, to thereby obtain masticated natural rubber. A time duration of from such loading to the kneading extruder to discharging there from was 7 minutes. A shear rate at this time was as follows:

$$\text{Shear rate (l/s)} = \pi \times 50 \times (100/60)/0.5$$
$$= 524$$

Example 2

Masticated natural rubber was obtained in a same manner as in Example 1 except that the number of rotations of the screw was changed from 100 rpm to 300 rpm. The time duration of from the loading to the extruder to the discharging therefrom was 6 minutes. A shear rate at this time was as follows:

$$\text{Shear rate (l/s)} = \pi \times 50 \times (300/60)/0.5$$
$$= 1,572$$

Example 3

Masticated natural rubber was obtained in a same manner as in Example 1 except that the number of rotations of the screw was changed from 100 rpm to 500 rpm. The time duration of from the loading to the extruder to the discharging therefrom was 5 minutes and 20 seconds. A shear rate at this time was as follows:

$$\text{Shear rate (l/s)} = \pi \times 50 \times (500/60)/0.5$$
$$= 2,620$$

Example 4

Masticated natural rubber was obtained in a same manner as in Example 1 except that the number of rotations of the screw was changed from 100 rpm to 750 rpm. The time duration of from the loading to the extruder to the discharging therefrom was 4 minutes and 30 seconds. A shear rate at this time was as follows:

$$\text{Shear rate (l/s)} = \pi \times 50 \times (750/60)/0.5$$
$$= 3,930$$

Comparative Example 1

2 kg of standard natural rubber SVR (weight-average molecular weight: 2,000,000) was loaded in a batch-type 3-liter pressure kneader (screw diameter: 156 mm, tip clearance: 2 mm) which has been set at 60° C. and, then, masticated for 20 minutes while the number of rotations of the screw was set to be 30 rpm, to thereby obtain masticated natural rubber. A shear rate at this time was as follows:

$$\text{Shear rate (l/s)} = \pi \times 156 \times (30/60)/2.0$$
$$= 123$$

Comparative Example 2

Masticated natural rubber was obtained in a same manner as in Comparative Example 1 except that a time duration of the mastication was changed from 20 minutes to 40 minutes.

Comparative Example 3

Masticated natural rubber was obtained in a same manner as in Comparative Example 1 except that a time duration of the mastication was changed from 20 minutes to 60 minutes.

Comparative Example 4

2 kg of standard natural rubber SVR (weight-average molecular weight: 2,000,000) was loaded in a batch-type 3-liter pressure kneader (screw diameter: 156 mm, tip clearance: 2 mm) which has been set at 60° C. and, further, added with 6 kg of a mastication accelerator (NOCTIZER SS: trade name; available from Ouchishinko Chemical Industrial Co., Ltd.) and, then, masticated for 20 minutes while the number of rotations of the screw was set to be 30 rpm, to thereby obtain masticated natural rubber.

Comparative Example 5

Masticated natural rubber was obtained in a same manner as in Comparative Example 4 except that a time duration of the mastication was changed from 20 minutes to 40 minutes.

Comparative Example 6

Masticated natural rubber was obtained in a same manner as in Comparative Example 4 except that a time duration of the mastication was changed from 20 minutes to 60 minutes.

Comparative Example 7

Standard natural rubber SVR (weight-average molecular weight: 2,000,000) was loaded in counter-rotating twin screw extruder CKH-J80 (trade name; available from Honda Machinery Works Co., Ltd.) (screw diameter: 80 mm, tip clearance: 1.5 mm) at a loading rate of 5 kg/hour and, then, masticated while the number of rotations of the screw was set to be 59 rpm, to thereby obtain masticated natural rubber. A time duration of from such loading to the kneader to discharging therefrom was 15 minutes. A shear rate at this time was as follows:

$$\text{Shear rate (l/s)} = \pi \times 80 \times (59/60)/1.5$$
$$= 165$$

Comparative Example 8

Standard natural rubber SVR (weight-average molecular weight: 2,000,000) was loaded in co-rotating twin screw extruder CKH-J50L (trade name; available from Honda Machinery Works Co., Ltd.) (screw diameter: 50 mm, tip clearance: 1.0 mm) at a loading rate of 5 kg/hour and, then, masticated while the number of rotations of the screw was set to be 100 rpm, to thereby obtain masticated natural rubber. A time duration of from such loading to the kneader to discharging therefrom was 10 minutes. A shear rate at this time was as follows:

$$\text{Shear rate (l/s)} = \pi \times 50 \times (100/60)/1.0$$
$$= 262$$

The masticated natural rubber obtained by each of Examples 1 to 4 and Comparative Examples 1 to 8 was subjected to a measurement of the weight-average molecular weight by the GPC. Results are shown in Table 1. Further, for reference purposes, the method of mastication, the number of rotations of the screw, the shear rate, presence or absence of the mastication accelerator and the time duration of the mastication are simultaneously shown in Table 1. This time duration of the mastication denotes a measurement of a time duration of from loading color pellets from a loading port to discharging a middle portion from a discharging port.

Further, at the time of mastication in each of Examples 1 to 4 and Comparative Examples 1 to 8, when a property of drawing the material in was examined, the property in each of Examples 1 to 4 and Comparative Examples 1 to 7 was favorable, while a bouncing phenomenon was found in Comparative Example 8 and, accordingly it was not acceptable.

TABLE 1

| | Type | Number of rotations of screw (rpm) | Shear rate (l/s) | Presence or absence of Mastication accelerator | Mastication time | Weight-average molecular weight (10,000) |
|---|---|---|---|---|---|---|
| Example 1 | Continuous | 100 | 524 | Absence | 7 min. | 130 |
| Example 2 | Continuous | 300 | 1,572 | Absence | 6 min. | 65 |
| Example 3 | Continuous | 500 | 2,620 | Absence | 5 mins. and 20 secs. | 44 |
| Example 4 | Continuous | 750 | 3,930 | Absence | 4 mins. and 30 secs. | 19 |
| Comparative Example 1 | Batch | 30 | 123 | Absence | 20 min. | 94 |
| Comparative Example 2 | Batch | 30 | 123 | Absence | 40 min. | 51 |
| Comparative Example 3 | Batch | 30 | 123 | Absence | 60 min. | 38 |
| Comparative Example 4 | Batch | 30 | 123 | Presence | 20 min. | 46 |
| Comparative Example 5 | Batch | 30 | 123 | Presence | 40 min. | 34 |
| Comparative Example 6 | Batch | 30 | 123 | Presence | 60 min. | 29 |
| Comparative Example 7 | Continuous | 59 | 165 | Absence | 15 min. | 131 |
| Comparative Example 8 | Continuous | 100 | 262 | Absence | 10 min. | 182 |

As is apparent from Table 1, in Examples 1 to 4, when the number of rotations of the screw was changed, the shear rate was changed and the molecular weight of the masticated natural rubber to be obtained was changed to a great extent and, on this occasion, as the shear rate came to be larger, the molecular weight came to be smaller and, further, a time duration of the mastication was less than 10 minutes which was satisfactory and extremely efficient.

From these findings, according to the present, the method is an innovative technique such that it is efficient, can arbitrarily control the molecular weight and can industrially be fully correspondable.

To contrast, Comparative Examples 1 to 6 refer to a batch-type and, as mastication time passed, the molecular weight was decreased; however, since it took one hour to decrease the weight-average molecular weight down to approximately 300,000 or less, this type is not efficient for being industrially applied. Although an effect in decreasing the molecular weight was noticed at an early stage by using the mastication accelerator, when the weight-average molecular weight came down to 400,000 or less, the effect is diminished.

Further, Comparative Examples 7 and 8 refer to a continuous type and, in a design in which the tip clearance was large and the number of rotations of the screw was small, since the shear rate is small, the effect of the mastication cannot be much expected.

While the invention has been described in detail and with reference to specific embodiments thereof, it will be apparent to one skilled in the art that various changes and modifications can be made therein without departing from the scope thereof.

This application is based on Japanese patent applications No. 2003-401328 filed on Dec. 1, 2003, the entire contents thereof being hereby incorporated by reference.

What is claimed is:

1. A method for producing a masticated rubber, which comprises the steps of:
    masticating natural rubber at a shear rate of from 500 to 4,500 (1/s), and
    obtaining masticated natural rubber having a weight-average molecular weight of from 100,000 to 1,300,000;
    wherein mastication is carried out with a kneader, and wherein said kneader has a diameter of a screw of 30 to 100 mm, and a tip clearance of 0.5 to 2.0 mm.

2. The method according to claim 1, wherein said kneader is a counter-rotating twin screw extruder.

3. The method according to claim 2, wherein the shear rate is from 1,000 to 4,000 (1/s).

* * * * *